United States Patent
Tortorella et al.

(10) Patent No.: US 11,951,687 B2
(45) Date of Patent: Apr. 9, 2024

(54) FATIGUE LIFE IMPROVEMENT OF ADHESIVELY BONDED JOINTS

(71) Applicant: Deere & Company, Moline, IL (US)

(72) Inventors: Nathan Tortorella, Bettendorf, IA (US); Rakesh Kumar Goyal, Pune (IN)

(73) Assignee: Deere & Company, Moline, IL (US)

( * ) Notice: Subject to any disclaimer, the term of this patent is extended or adjusted under 35 U.S.C. 154(b) by 310 days.

(21) Appl. No.: 17/143,198

(22) Filed: Jan. 7, 2021

(65) Prior Publication Data

US 2022/0212417 A1 Jul. 7, 2022

(51) Int. Cl.
*B29C 65/48* (2006.01)
*B29C 65/00* (2006.01)

(52) U.S. Cl.
CPC ...... *B29C 65/4805* (2013.01); *B29C 66/0222* (2013.01); *B29C 66/0324* (2013.01)

(58) Field of Classification Search
None
See application file for complete search history.

(56) References Cited

U.S. PATENT DOCUMENTS

| | | | |
|---|---|---|---|
| 5,522,725 | A | 6/1996 | Jordan et al. |
| 5,735,044 | A | 4/1998 | Ferrigno et al. |
| 8,776,564 | B2 | 7/2014 | Shimanuki et al. |
| 8,834,126 | B2 | 9/2014 | Hansen et al. |

FOREIGN PATENT DOCUMENTS

| | | |
|---|---|---|
| DE | 102005014902 A1 | 10/2006 |
| GB | 2182996 A | 5/1987 |

OTHER PUBLICATIONS

Rudawska et al, Effect of the Application of Different Surface Treatment Methods on the Strength of Titanium Alloy Sheet Adhesive Lap Joints. Materials. (Year: 2019).*
Mannens et al, Influence of Impact Force, Impact Angle, and Stroke Length in Machine Hammer Peening on the Surface Integrity of the Stainless Steel X3CrNiMo13-4, Procedia CIRP, vol. 71, pp. 166-171 (Year: 2018).*
Plexus MA422 Technical Data Sheet (May 2018)(2 pages).
Henkel Teroson EP 5065 Technical Data Sheet (Jul. 2019) (2 pages).
Henkel Teroson EP 5089 safety data sheet (Jun. 6, 2019)(6 pages).
SikaPower 1277 product information (undated but admitted to be prior art)(3 pages).
German Search Report issued in application No. DE102021213336.3 dated Jul. 15, 2022 (08 pages).

* cited by examiner

*Primary Examiner* — Jacob T Minskey
*Assistant Examiner* — Adrianna N Konves
(74) *Attorney, Agent, or Firm* — Lucian Wayne Beavers; Patterson Intellectual Property Law, PC

(57) ABSTRACT

A method is provided for manufacturing an adhesively bonded structure including first and second components including first and second outer surfaces, respectively, at least the first component being a first metal component, the first and second outer surfaces facing one another and partially overlapping, and the adhesively bonded structure including an adhesive layer received between overlapping portions of the first and second outer surfaces. The method includes deforming the first outer surface of the first metal component along a first isolated path extending beside the first edge of the adhesive layer along at least a majority of a length of the first edge of the adhesive layer.

14 Claims, 5 Drawing Sheets

FATIGUE LIFE IMPROVEMENT OF ADHESIVELY BONDED JOINTS

FIELD OF THE DISCLOSURE

The present disclosure relates to adhesively bonded structures and to methods of manufacturing adhesively bonded structures.

BACKGROUND

Adhesive bonding is a low cost, simple manufacturing method that is typically applied to thin metal assemblies. Advantages include bonding and sealing in one step, reduction in noise transmission, low cost to join mixed materials, long fatigue life, and high impact resistance.

There are limitations, though, with adhesive bonding. Like many other joining methods, adhesively bonded joints have a finite life when experiencing cyclic loads. This is especially true when cycles to failure are low (i.e. loads are very high). High loads result in crack initiation and propagation, whereas low loads result in creep of the adhesive layer. Fatigue life and ultimate joint strength are directly related to the steel thickness and begin to plateau at a given thickness. Methods to improve strength and/or fatigue life include adding material (by extending the overlap) or fixing the edge of the overlap (by tack welding). These methods increase cost and weight of the assembly.

In case of adhesive joints, the stress distribution is relatively more uniform than with other conventional methods of joining which enables a reduction in weight. But even in adhesive joints the stress distribution is not perfectly uniform (due to localized stresses). From the joint mechanics point of view, the major limiting factor for adhesive joints is peel or cleavage stress. These should be reduced if strong joints are to be designed. This situation of high peel stress concentrations at the edge of the overlap is exacerbated in assemblies with unbalanced adherend stiffnesses. Fatigue cracks almost always initiate at the highly stressed edges of the adhesive joints.

Figure 1:
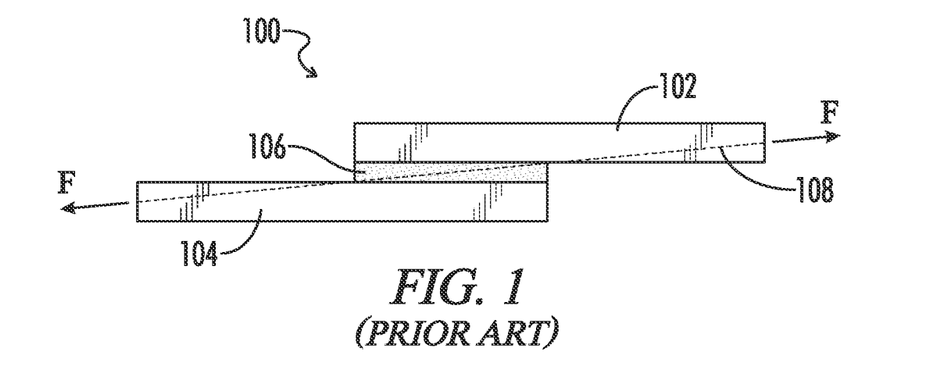
FIG. 1 is schematic representation of a prior art adhesively bonded joint.

FIG. 1 schematically illustrates a typical prior art adhesively bonded metal structure 100 including first and second metal sheets 102 and 104 bonded together by an adhesive layer 106. The application of a tensile force across the joint is schematically indicated by the arrows F and the load is applied generally in the direction of the dashed line 108.

Figure 2:
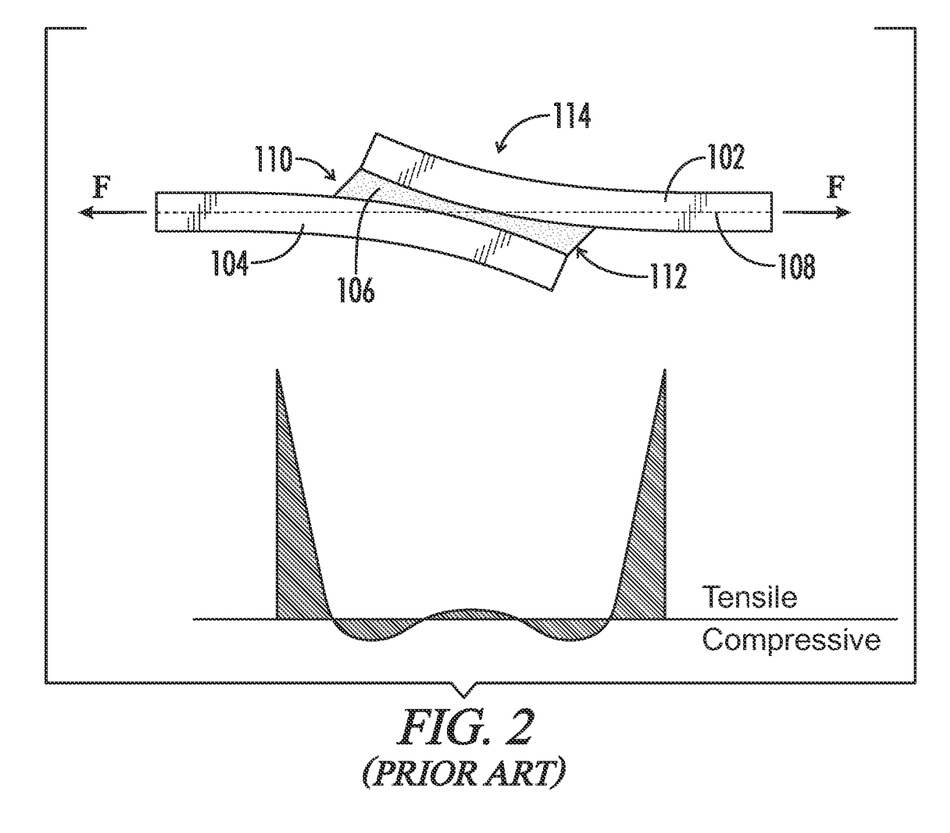
FIG. 2 is a schematic representation of the prior art adhesively bonded joint of FIG. 1 under load, with a superimposed diagram representative of the stress distribution within the adhesive layer

FIG. 2 schematically illustrates the same structure of FIG. 1 after the load F is sufficient to deform the joint. FIG. 2 includes a superimposed graphic representation of the stress distribution within the adhesive layer 106. High magnitude tensile stresses peak at the edges 110 and 112 of the overlap, and small compressive stresses are located in the area 114 towards the center of the overlap. It is in these areas 110 and 112 where fatigue cracks typically initiate in prior art structures.

Accordingly, there is a continuing need for improved methods of manufacturing adhesively bonded metal structures having improved strength and fatigue life without increasing weight of the structures and at low cost.

SUMMARY OF THE DISCLOSURE

In one embodiment a method is provided of manufacturing an adhesively bonded structure including first and second components including first and second outer surfaces, respectively, at least the first component being a first metal component, the first and second outer surfaces facing one another and partially overlapping, and the adhesively bonded metal structure including an adhesive layer received between overlapping portions of the first and second outer surfaces. The method may include the steps of:

(a) deforming the first outer surface of the first metal component along a first isolated path;

(b) adhesively bonding the overlapping portions of the first and second outer surfaces to form the adhesive layer such that the adhesive layer includes a first edge laterally facing a non-overlapping portion of the first outer surface and the adhesive layer includes a second edge laterally facing a non-overlapping portion of the second outer surface; and (c) wherein the first isolated path extends beside the first edge of the adhesive layer along at least a majority of a length of the first edge of the adhesive layer.

In another embodiment an adhesively bonded structure may include first and second metal components including first and second outer surfaces, respectively, the first and second outer surfaces facing one another and partially overlapping. An adhesive layer may be received between overlapping portions of the first and second outer surfaces, the adhesive layer including a first edge laterally facing a non-overlapping portion of the first outer surface and a second edge laterally facing a non-overlapping portion of the second outer surface. The first outer surface of the first metal component may be deformed along a first isolated path extending beside the first edge of the adhesive layer along at least a majority of a length of the first edge of the adhesive layer. The second outer surface of the second metal component may be deformed along a second isolated path extending beside the second edge of the adhesive layer along at least a majority of a length of the second edge of the adhesive layer.

Numerous objects, features and advantages of the present invention will be readily apparent to those skilled in the art upon a review of following description in conjunction with the accompanying drawings.

DETAILED DESCRIPTION

Figure 3:
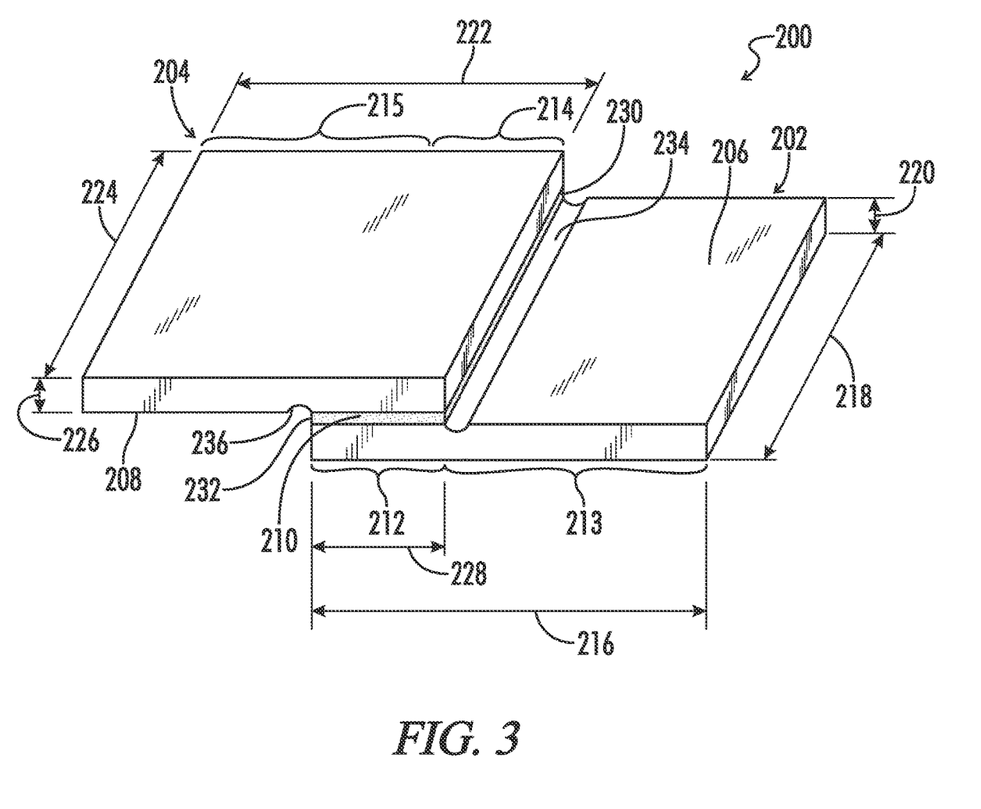
FIG. 3 is a schematic perspective view of an adhesively bonded metal structure formed by the methods of the present invention.

Referring now to the drawings and particularly to FIG. 3 an adhesively bonded structure 200 includes first and second components 202 and 204 including first and second outer surfaces 206 and 208, respectively. The first and second outer surfaces 206 and 208 face one another and at least partially overlap. The first outer surface may include an overlapping portion 212 and a non-overlapping portion 213. The second outer surface 208 may include an overlapping portion 214 and a non-overlapping portion 215. The adhesively bonded structure 200 includes an adhesive layer 210 received between the overlapping portions 212 and 214 of the first and second outer surfaces 206 and 208.

At least the first component 202 may be a first metal component 202. In an embodiment the first component 202 may be a metal component and the second component 204 may be a non-metal component. In another embodiment both the first and second components may be metal components. In an embodiment one or both of the metal components may be steel sheet material having thicknesses of at least about 2.0 mm.

The adhesive layer 210 includes a first edge 230 laterally facing the non-overlapping portion 213 of the first outer surface 206 and a second edge 232 laterally facing the non-overlapping portion 215 of the second outer surface 208.

In FIG. 3 the geometry and dimensions of the components 202 and 204 may be described within an x, y, z co-ordinate system that is represented in the drawing. The components may be described as having a length along the x axis, a width along the y axis, and a thickness along the z axis.

Thus the first component 202 has a length 216, a width 218 and a thickness 220. The second component 204 has a length 222, a width 224 and a thickness 226. The overlapping portions 212 and 214 have an overlap length 228.

We have discovered the surprising result that certain surface treatments on the metal components 202 and 204 can improve the fatigue life of the adhesive joint 210 between those metal components.

In one embodiment the first outer surface 206 of the first metal component 202 may be deformed along a first isolated path 234 extending beside the first edge 230 of the adhesive layer 210 along at least a majority of a length of the first edge of the adhesive layer. The second outer surface 208 of the second metal component 204 may be deformed along a second isolated path 236 extending beside the second edge 232 of the adhesive layer 210 along at least a majority of a length of the second edge 232 of the adhesive layer 210. In the example shown the lengths of the first and second edges 230 and 232 are equal to the widths 218, 224 of the adjoined components 202 and 204.

As used herein the term "isolated path" refers to a path of deformed metal which lies between regions of non-deformed metal on either side of the path. Thus a metal component 202 having its entire outer surface 206 deformed, for example by shot peening, would not have an isolated path of deformed metal.

Figures 6, 7:
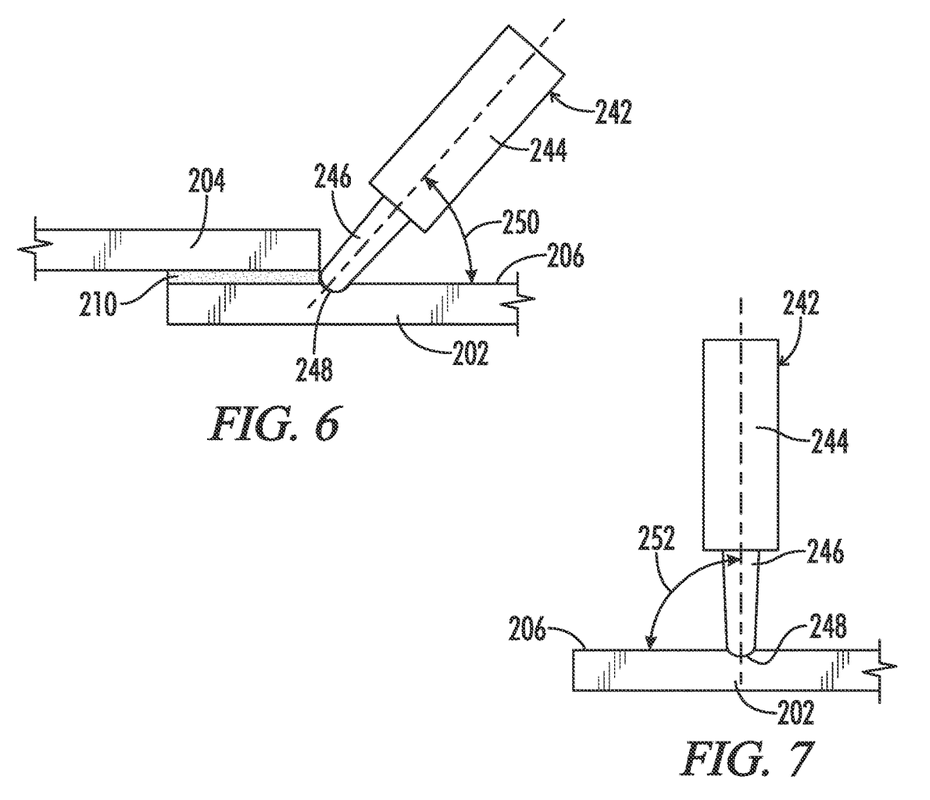
FIG. 6 is a schematic representation of a high frequency impact tool performing the deformation of the metal sheet like that of FIG. 4.
FIG. 7 is a schematic representation of a high frequency impact tool performing the deformation of the metal sheet like that of FIG. 5.

The deformation of the metal components to form the isolated path 234 may for example be achieved by high frequency mechanical impact using an impact tool such as the HiFit pneumatic tool available from HiFIT Vertriebs GmbH, Adam-Opel-Straße 4 D-38112 Braunschweig, Germany. Such a pneumatic tool is schematically illustrated in FIGS. 6 and 7 and is identified by the number 242. The pneumatic tool 242 includes a pneumatic driver 244 which reciprocates an impact tool 246 having a tip 248 which may be generally semi-spherical in shape.

Figure 4:
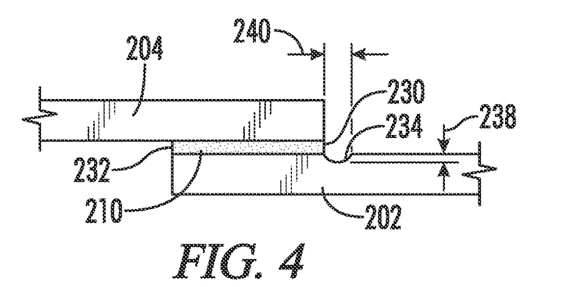
FIG. 4 is a schematic representation of an adhesively bonded metal structure wherein the deformation of the metal structure adjacent the adhesive layer is performed after the construction of the adhesively bonded metal structure.
Figure 5:
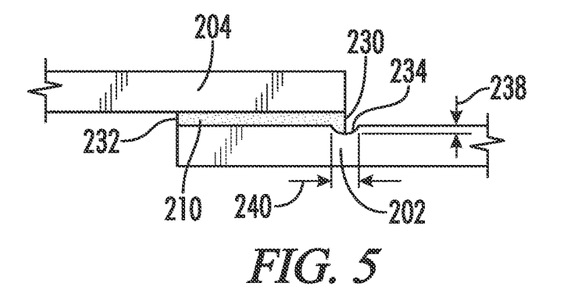
FIG. 5 is a schematic representation of an adhesively bonded metal structure wherein the deformation of the metal structure adjacent the adhesive layer is performed before the construction of the adhesively bonded metal structure.

The isolated paths 234 and 236 may be in the shape of a rounded groove as is formed by the semi-spherical tip 248 of an impact tool like the HiFit tool referenced above. FIGS. 4 and 5 schematically illustrate two embodiments of the isolated path 234. The groove may have a groove depth 238 of at least about 0.1 mm and a groove width 240 in a range of from about 1.0 to about 3.0 mm.

In FIG. 4 the isolated path 234 has been formed after the adhesive joint 200 is created by bonding the two components 202 and 204 together with the adhesive layer 210. Thus the isolated path 234 has been formed as closely adjacent the first edge 230 as is practical. The isolated path of FIG. 4 may be described lying laterally outside the adhesive layer. Preferably the isolated path 204 either touches the edge 230 or is spaced from the edge 230 by no more than the thickness 220 of the first metal component 202 perpendicular to the first outer surface 206.

In FIG. 5 the isolated path has been formed before the adhesive joint 200 is created, thus the adhesive layer 210 may partially or completely overlap with the isolated path 234. In FIG. 5 the adhesive layer 210 is shown partially overlapping the isolated path 234.

Collectively the isolated path 234 as shown in FIGS. 4 and 5 can be described as either at least in part underlying the adhesive layer 210 as seen in FIG. 5 or lying laterally outside the adhesive layer 210 as seen in FIG. 4 by no more than the thickness 220 of the first metal component 202 perpendicular to the first outer surface 206.

FIGS. 6 and 7 schematically illustrate how the pneumatic tool 242 may be used to form the isolated path 234 prior to or after formation of the adhesive joint 200, thus corresponding to the resulting structures seen in FIGS. 4 and 5, respectively.

If the isolated path 234 is formed in the metal component 202 after formation of the adhesive joint 200, the impact driver is preferably at an angle such as 250 with the tip 248 as close as practical to the edge 230 of adhesive layer 210. The angle 250 may be in a range of 30 degrees to 80 degrees. In an embodiment the angle 250 may be in a range of 60 degrees to 75 degrees. In a further embodiment the angle may be about 67 degrees. The isolated path 234 extends beside the edge 230 along a majority of the length of the edge 230, and preferably along the entire length of the edge 230. In an embodiment the isolated path 234 may touch the edge 230 or is separated from the edge 230 by a distance no greater than the thickness 220 of component 202 along a majority of the length of the edge 230, and preferably along the entire length of the edge 230.

If the isolated path 234 is formed in the metal component 202 before formation of the adhesive joint 200, the impact driver is preferably at an angle such as 252 with the tip 248 essentially perpendicular to the surface 206. The angle 252 may be in a range of 80 degrees to 100 degrees. When the isolated path is formed prior to the construction of the adhesive joint 200 the adhesive layer 210 may extend into the isolated path as seen in FIG. 5. The edge 230 may lie within the adhesive path 234 as seen in FIG. 5, or the edge 230 may even lie on the far side of isolated path 234. If the edge 230 does lie on the far side of isolated path 234 so that path 234 is completely covered, preferably the edge 230 extends past the isolated path 234 by no more than the width 220 of the component 202 along a majority of the length of the edge 230, and preferably along the entire length of the edge 230.

Using either of the methods illustrated in FIG. 6 or 7, there may be preferred parameters for operation of the pneumatic tool 242.

The tip 248 may have a tip diameter in a range of from about 0.5 mm to about 3.0 mm.

The pneumatic drive 244 may be operated to apply a force to the impact tool 246 in a range of from about 0.5 pound to about 15.0 pounds.

The pneumatic tool 242 may be moved along the isolated path at a travel speed in a range of from about 0.1 to about 20.0 inches per second. In a further embodiment the pneumatic tool 242 may be moved along the isolated path at a travel speed in a range of from about 0.1 to about 10.0 inches per second.

The isolated path 234 may be formed in a single pass or in multiple passes of the pneumatic tool 242.

In one example the HiFit tool was oriented perpendicular to the steel sheet as shown in FIG. 7 and applied on a part before applying adhesive. The HiFit tool had a tip diameter of 1.5 mm. The steel sheet was 3 mm thick 350 MPa yield strength steel. Three passes were used. The first pass created a rough groove with a depth of 322 microns and peak-to-peak width of about 1 mm. A second pass increased the depth to 338 microns and width of about 2 mm. A third pass resulted in a depth of 514 microns and width of about 2.4 mm.

In another example the Hifit tool was applied after formation of the adhesively bonded joint. The HiFit tool was oriented as shown in FIG. 6 at an angle 250 of about 67 degrees. The HiFit tool had a tip diameter of 1.5 mm. The steel sheet was 3 mm thick 350 MPa yield strength steel. A single pass was used resulting in an asymmetric trough or groove having a peak of 349 microns high on one side closest to the adhesive layer 210, and a peak of 186 microns on the other side. The trough had a width 240 of about 2.6 mm.

The pneumatic tool 242 may be operated at a tip impact frequency in a range of from about 100 impacts per second to about 400 impacts per second. In an embodiment the tip impact frequency in a range of from about 150 impacts per second to about 300 impacts per second. In a further embodiment the tip impact frequency in a range of from about 200 impacts per second to about 250 impacts per second.

The action of the pneumatic tool 242 impacting the surface 206 of metal component 202 with tip 248 creates a compressive residual stress in the metal below and adjacent the isolated path 234. There is a local work hardening and/or strain hardening of the metal. It is not fully understood how this deformed metal area of the isolated path 234 interacts with the adhesive layer 210 to increase the fatigue life of the adhesive layer 210, but as the test data discussed below shows there is such an improved fatigue life in some instances.

It further appears that the improved fatigue life is more consistently achieved when the isolated path 234 is combined with an adhesive layer 210 formed from a preferred adhesive material. In an embodiment the adhesive material may be selected from the group consisting of an epoxy adhesive, a polyurethane adhesive and an acrylic adhesive. In another embodiment the adhesive may be a high crash resistant epoxy adhesive.

Methods of Manufacture:

In an embodiment a method is provided of manufacturing an adhesively bonded structure 200 including first and second components 202 and 204 including first and second outer surfaces 206 and 208, respectively, at least the first component 202 being a first metal component, the first and second outer surfaces 206 and 208 facing one another and partially overlapping, and the adhesively bonded structure including an adhesive layer 210 received between overlapping portions 212 and 214 of the first and second outer surfaces, the method comprising:

(a) deforming the first outer surface 206 of the first metal component 202 along a first isolated path 234;

(b) adhesively bonding the overlapping portions 212 and 214 of the first and second outer surfaces 206 and 208 to form the adhesive layer 210 such that the adhesive layer includes a first edge 230 laterally facing a non-overlapping portion 213 of the first outer surface 206 and the adhesive layer includes a second edge 232 laterally facing a non-overlapping portion 215 of the second outer surface 208; and (c) wherein the first isolated path extends 234 beside the first edge 230 of the adhesive layer 210 along at least the majority of a length of the first edge of the adhesive layer.

In one embodiment step (a) may be performed before step (b) as schematically illustrated in FIG. 7. In a further embodiment step (b) may be performed before step (a) as schematically illustrated in FIG. 6.

When the second component 204 is also a metal component the method may further include deforming the second outer surface 208 of the second metal component 204 along a second isolated path 236, wherein the second isolated path 236 extends beside the second edge 232 of the adhesive layer 210 along at least a majority of a length of the second edge 232 of the adhesive layer 210.

In an embodiment in step (a) the deforming may be performed by high frequency mechanical impact with a tool such as the pneumatic impact tool 242.

In a further embodiment in step (a) the high frequency mechanical impact may be performed using an impact tool 246 having a tip diameter in a range of from about 0.5 mm to about 3.0 mm.

In a further embodiment in step (a) the high frequency mechanical impact may be performed using an impact tool having an impact force in a range of from about 0.5 lbs to about 15 lbs.

In a further embodiment in step (a) the high frequency mechanical impact may be performed using an impact tool having a travel speed in a range of from about 0.1 inch/second to about 20 inch/second.

In a further embodiment in step (a) the high frequency mechanical impact may be performed by multiple passes of the impact tool.

In a further embodiment in step (a) the deforming may create a groove 230 in the first outer surface. The groove 230 may have a depth of at least 0.1 mm and a width in a range of from about 1.0 mm to about 3.0 mm.

In an embodiment in step (a) the deforming of the first outer surface 206 of the first metal component 202 may increase a fatigue life of the adhesive layer 210.

In an embodiment in step (b) the adhesive may be selected from the group consisting of an epoxy adhesive, a polyurethane adhesive and an acrylic adhesive.

Examples

A number of fatigue tests were performed to evaluate the disclosed methods of manufacturing adhesive joints. In the fatigue tests, the samples were always in tension (at both the high and low stress levels during the cycle). Two different load levels (Minimum 5%/Maximum 50% or Minimum 4%/Maximum 40%) of static joint strength were investigated. This means an R-Ratio of 0.1 was used. Test frequency was 5 Hz. The tests were run using a closed loop servo-hydraulic 100 kN two post frame with a Model 8801 fatigue test machine manufactured by Instron. The adhesively bonded joints were shaped substantially as shown in FIG. 3 having widths 218, 200 of about 38 mm and having an overlap length 228 of about 25 mm. The adhesive layer 210 had a thickness of about 0.25 mm.

Figure 8:
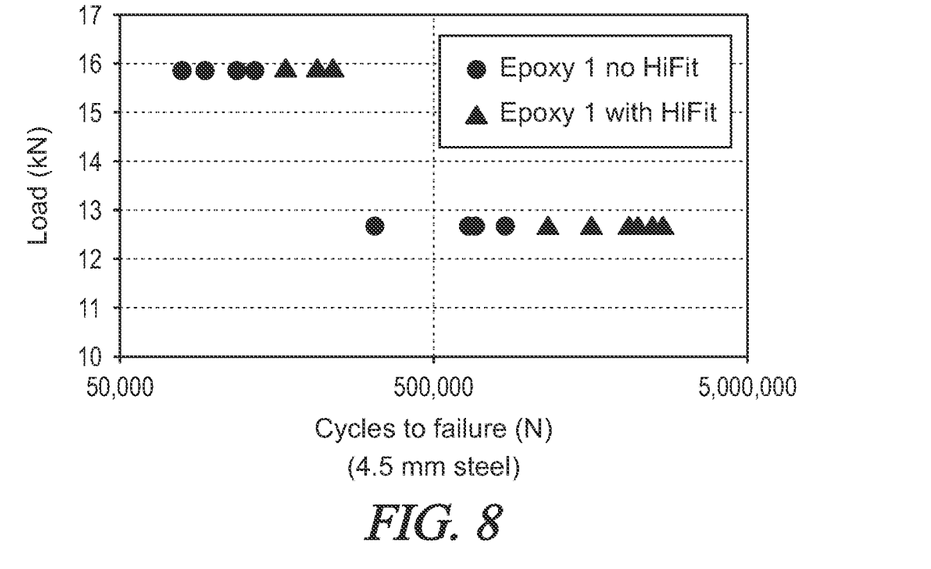
FIG. 8 is a graphical representation of fatigue testing data using a first example adhesive with a 4.5 mm thick steel sample.

FIG. 8 graphically shows fatigue life of one type of adhesive (named Epoxy 1) with and without deformation of the metal component using the HiFit impact tool at two different load levels. HiFit was applied after bonding of the 4.5 mm thick steel coupons. The fatigue life of the HiFit treated samples increased by an average of 3.5× at the 40% load level and 2× at the 50% load level.

Figure 11:
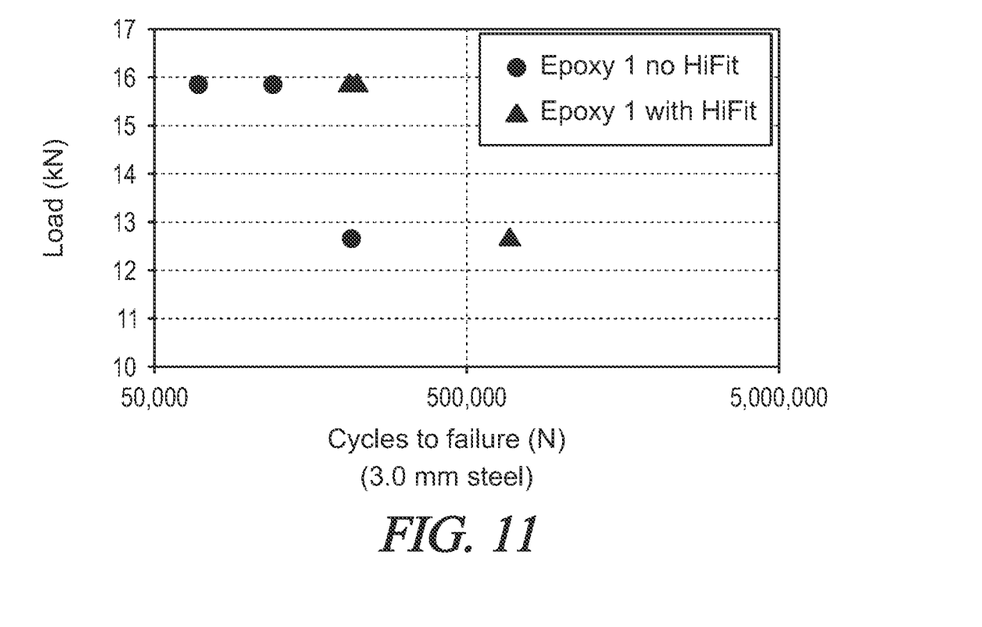
FIG. 11 is a graphical representation of fatigue testing data using the first example adhesive, this time with a 3.0 mm thick steel sample.

FIG. 11 graphically shows fatigue life of the Epoxy 1 adhesive, this time using 3.0 mm thick steel coupons, with and without deformation of the metal component using the HiFit impact tool at two different load levels. The fatigue life of the HiFit treated samples increased by an average of 3.3× at the lower load level and 1.5× at the higher load level.

Epoxy 1 was a 1-part epoxy adhesive available from Henkel under the tradename Teroson EP 5089. The Teroson EP 5089 adhesive is described by Henkel as having a high crash resistance of greater than 20 N/mm up to −40 degrees C. It is described as having a nano-dispersion embedded into an epoxy matrix. It is described as having a very high static strength, an E-modulus greater than 1600 MPa, and a low temperature curing capability.

Figure 9:
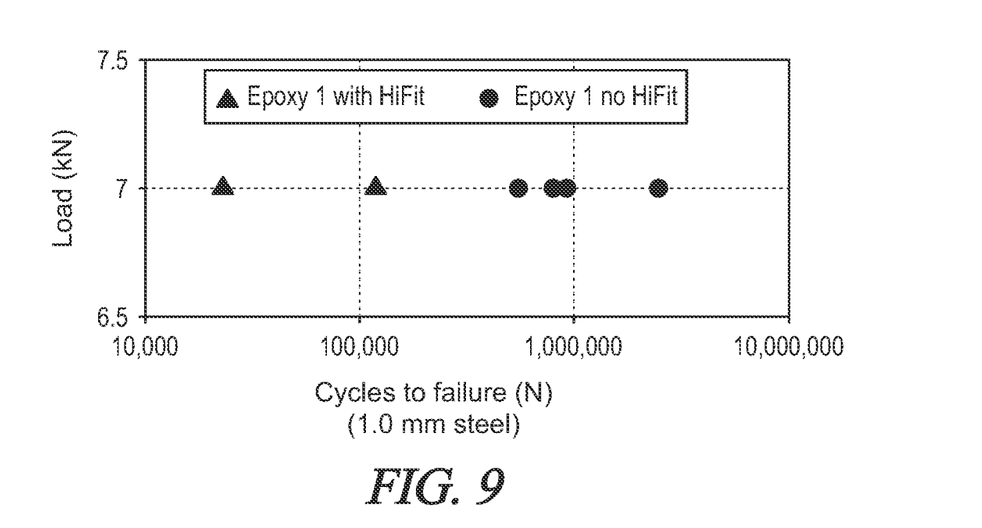
FIG. 9 is a graphical representation of fatigue testing data showing adverse results for an adhesive joint using a relatively thin 1.0 mm thick metal sheet.

FIG. 9 represents a test run to determine the applicability of the process to very thin steel sheets. In the test of FIG. 9 the HiFit process was applied to an adhesively bonded structure made from 1 mm thick steel sheets. It is seen that there was a significant reduction in fatigue life after the HiFit treatment. For this reason, we have concluded that the process should only be applied to steel sheets having a thickness of at least about 2.0 mm.

Figure 10:
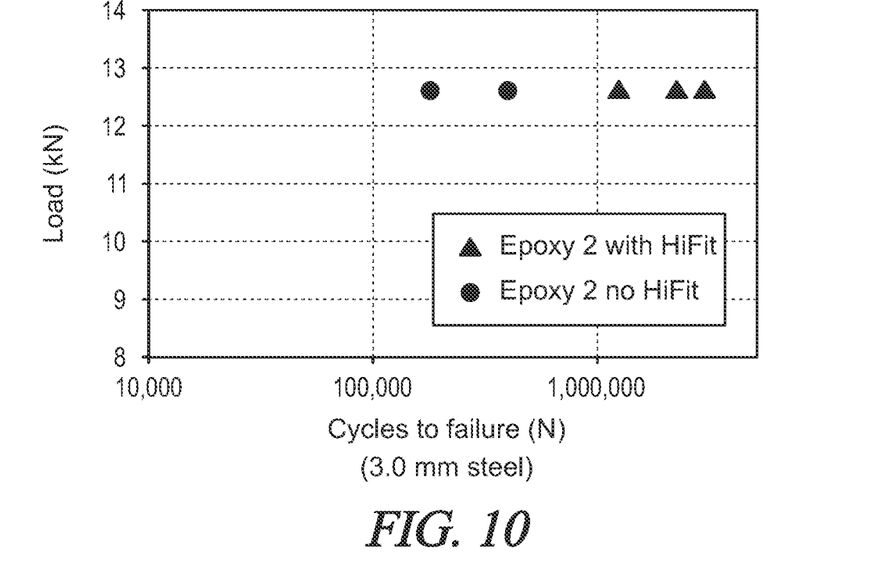
FIG. 10 is a graphical representation of fatigue testing data using a second example adhesive with a 3.0 mm thick steel sample.

FIG. 10 shows fatigue life of one type of adhesive (named Epoxy 2) with and without deformation of the metal component using the HiFit impact tool at one load level. HiFit was applied before bonding of the 3.0 mm thick steel coupons. The fatigue life of the HiFit treated samples increased by an average of 7.5×. Epoxy 2 was a 2-part epoxy adhesive available from Henkel under the tradename Teroson 5065.

On the other hand, it is noted that tests similar to that of FIG. 10 were run using several other adhesives which did not result in an increase in fatigue life of the HiFit treated samples. Those other adhesives included: (1) a 2-part epoxy adhesive available from Sika under the tradename Sikapower 1277; (2) a 2-part methyl methacrylate adhesive available from Lord under the tradename 850/25 GB; and (3) a 2-part methyl methacrylate adhesive available from ITW under the tradename Plexus MA422.

It is not yet understood why the disclosed process of deforming the metal component leads to an increase in fatigue life of the adhesive layer. And it is not understood why the improvement in fatigue life occurs with some adhesives and not with others. But any proposed combination of metal components and adhesive materials for an adhesively bonded joint can be readily tested by the techniques disclosed herein to determine whether the methods disclosed herein are applicable.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims Each disclosed feature or embodiment may be combined with any of the other disclosed features or embodiments.

What is claimed is:

1. A method of manufacturing an adhesively bonded structure including first and second components including first and second outer surfaces, respectively, at least the first component being a first metal component, the first and second outer surfaces facing one another and partially overlapping, and the adhesively bonded structure including an adhesive layer received between overlapping portions of the first and second outer surfaces, the method comprising:
   (a) deforming the first outer surface of the first metal component along a first isolated path;
   (b) adhesively bonding the overlapping portions of the first and second outer surfaces to form the adhesive layer such that the adhesive layer includes a first edge laterally facing a non-overlapping portion of the first outer surface and the adhesive layer includes a second edge laterally facing a non-overlapping portion of the second outer surface, wherein the adhesive layer is formed from an adhesive selected from the group consisting of an epoxy adhesive, a polyurethane adhesive, and an acrylic adhesive; and
   (c) wherein the first isolated path extends beside the first edge of the adhesive layer along at least a majority of a length of the first edge of the adhesive layer and wherein the deforming of the first outer surface of the first metal component increases a fatigue life of the adhesive layer.

2. The method of claim 1, wherein:
   the first isolated path either at least in part underlies the adhesive layer or lies laterally outside the adhesive layer by no more than a thickness of the first metal component perpendicular to the first outer surface.

3. The method of claim 1, wherein step (a) is performed before step (b).

4. The method of claim 1, wherein step (b) is performed before step (a).

5. The method of claim 1, wherein the second component is a second metal component, and further comprising:
   deforming the second outer surface of the second metal component along a second isolated path, wherein the second isolated path extends beside the second edge of the adhesive layer along at least a majority of a length of the second edge of the adhesive layer.

6. The method of claim 1, wherein the first and second components are first and second metal sheets.

7. The method of claim 6, wherein the first and second metal sheets are steel sheets having a thickness of at least about 2.0 mm.

8. The method of claim 1, wherein;
   in step (a) the deforming is performed by high frequency mechanical impact.

9. The method of claim 8, wherein;
   in step (a) the high frequency mechanical impact is performed using an impact tool having a tip diameter in a range of from about 0.5 mm to about 3.0 mm.

10. The method of claim 8, wherein;
    in step (a) the high frequency mechanical impact is performed using an impact tool having an impact force in a range of from about 0.5 lbs to about 15 lbs.

11. The method of claim 8, wherein;
    in step (a) the high frequency mechanical impact is performed using an impact tool having a travel speed in a range of from about 0.1 inch/second to about 20 inch/second.

12. The method of claim 8, wherein;
    in step (a) the high frequency mechanical impact is performed by multiple passes of an impact tool.

13. The method of claim 1, wherein;
    in step (a) the deforming creates a groove in the first outer surface.

14. The method of claim 13, wherein;
    in step (a) the groove has a depth of at least about 0.1 mm.

* * * * *